United States Patent [19]
Sudduth et al.

[11] Patent Number: 5,426,308
[45] Date of Patent: Jun. 20, 1995

[54] ULTRAVIOLET CURING DEVICE HAVING MOVABLE REFLECTOR

[75] Inventors: Donald L. Sudduth; Jimmy R. Hedge; Jose A. Garcia, all of Redondo Beach; Vladimir Danilychev, Irvine, all of Calif.

[73] Assignee: Lesco, Inc., Redondo Beach, Calif.

[21] Appl. No.: 300,697

[22] Filed: Sep. 1, 1994

Related U.S. Application Data

[63] Continuation of Ser. No. 70,108, May 28, 1993.

[51] Int. Cl.⁶ .............................................. F21L 15/02
[52] U.S. Cl. ........................... 250/504 H; 250/504 R; 362/187
[58] Field of Search ............. 250/493.1, 503.1, 504 R, 250/504 H; 362/187

[56] References Cited

U.S. PATENT DOCUMENTS

| | | | |
|---|---|---|---|
| 1,800,277 | 4/1931 | Boerstler | 250/504 |
| 4,298,806 | 11/1981 | Herold | 250/504 |
| 4,560,883 | 12/1985 | Kerschgens | 250/504 |
| 4,605,994 | 8/1986 | Krieg | 362/202 |
| 4,855,718 | 8/1989 | Cholin et al. | 340/578 |
| 4,904,052 | 2/1990 | Rand et al. | 350/96.33 |
| 5,213,408 | 5/1993 | Shiau | 362/187 |

FOREIGN PATENT DOCUMENTS

| | | |
|---|---|---|
| 455596 | 10/1936 | United Kingdom . |
| 810256 | 3/1959 | United Kingdom . |

Primary Examiner—Jack I. Berman
Assistant Examiner—James Beyer
Attorney, Agent, or Firm—Stetina Brunda & Buyan

[57] ABSTRACT

An ultraviolet curing device comprising a housing having a wave guide disposed within one end thereof. Disposed within the housing and reciprocally movable between focused and unfocused positions therewithin is a reflector member which is oriented relative the light source so as to be operable to reflect ultraviolet light from the light source to the wave guide. When the reflector member is in the focused position, ultraviolet light is reflected from the light source to the wave guide in a manner facilitating the passage of a desired frequency of the ultraviolet light through the wave guide. When the reflector member is in the unfocused position, ultraviolet light is reflected from the light source to the wave guide in a manner preventing the passage of the desired frequency of the ultraviolet light through the wave guide.

16 Claims, 4 Drawing Sheets

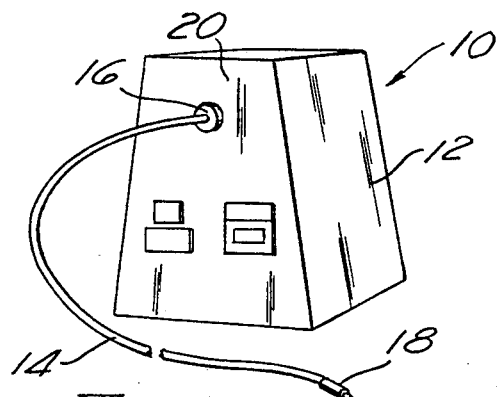
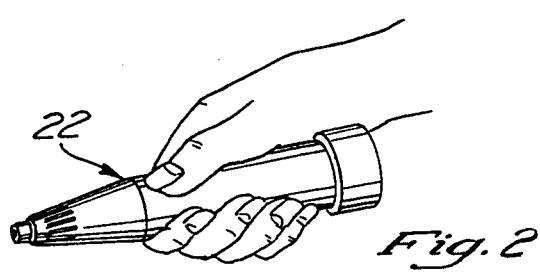
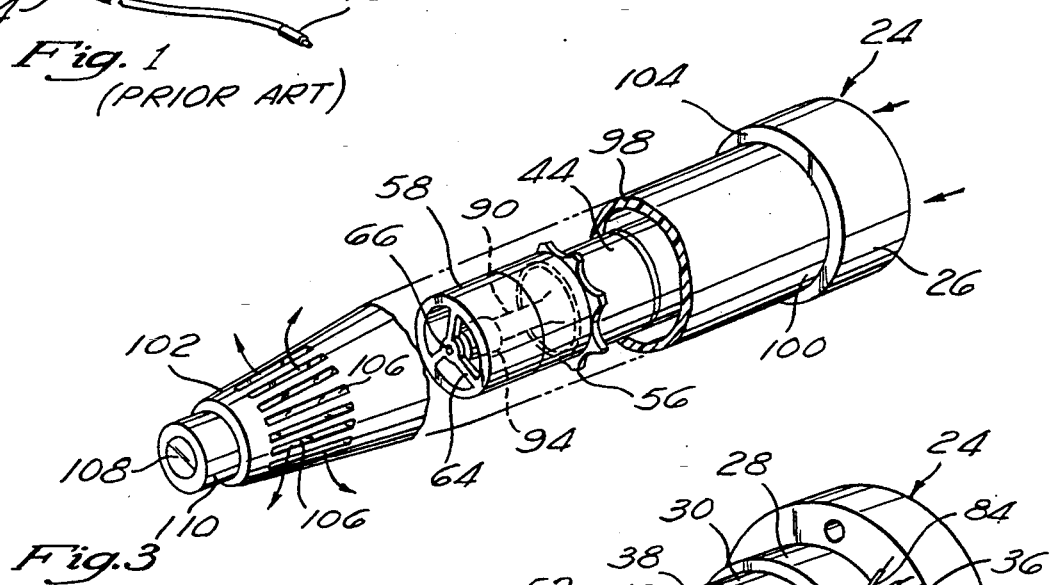
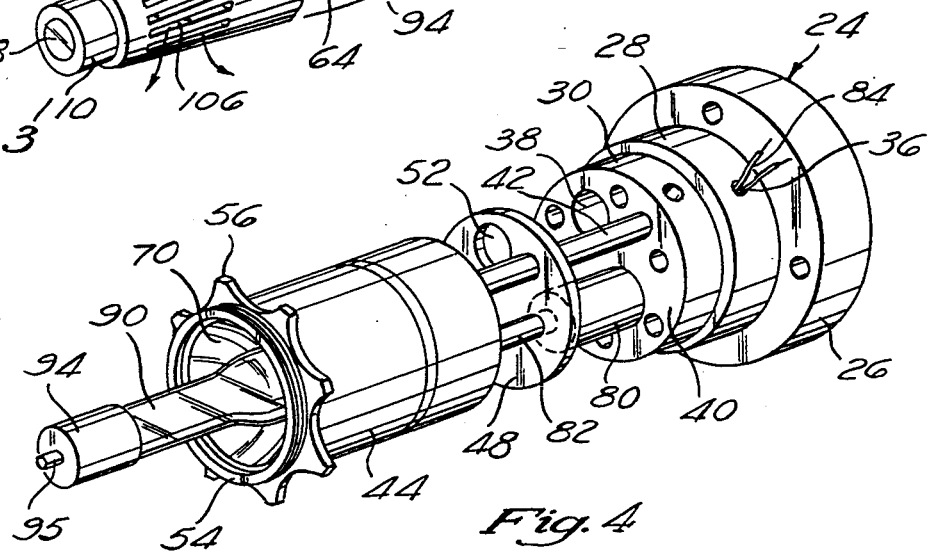

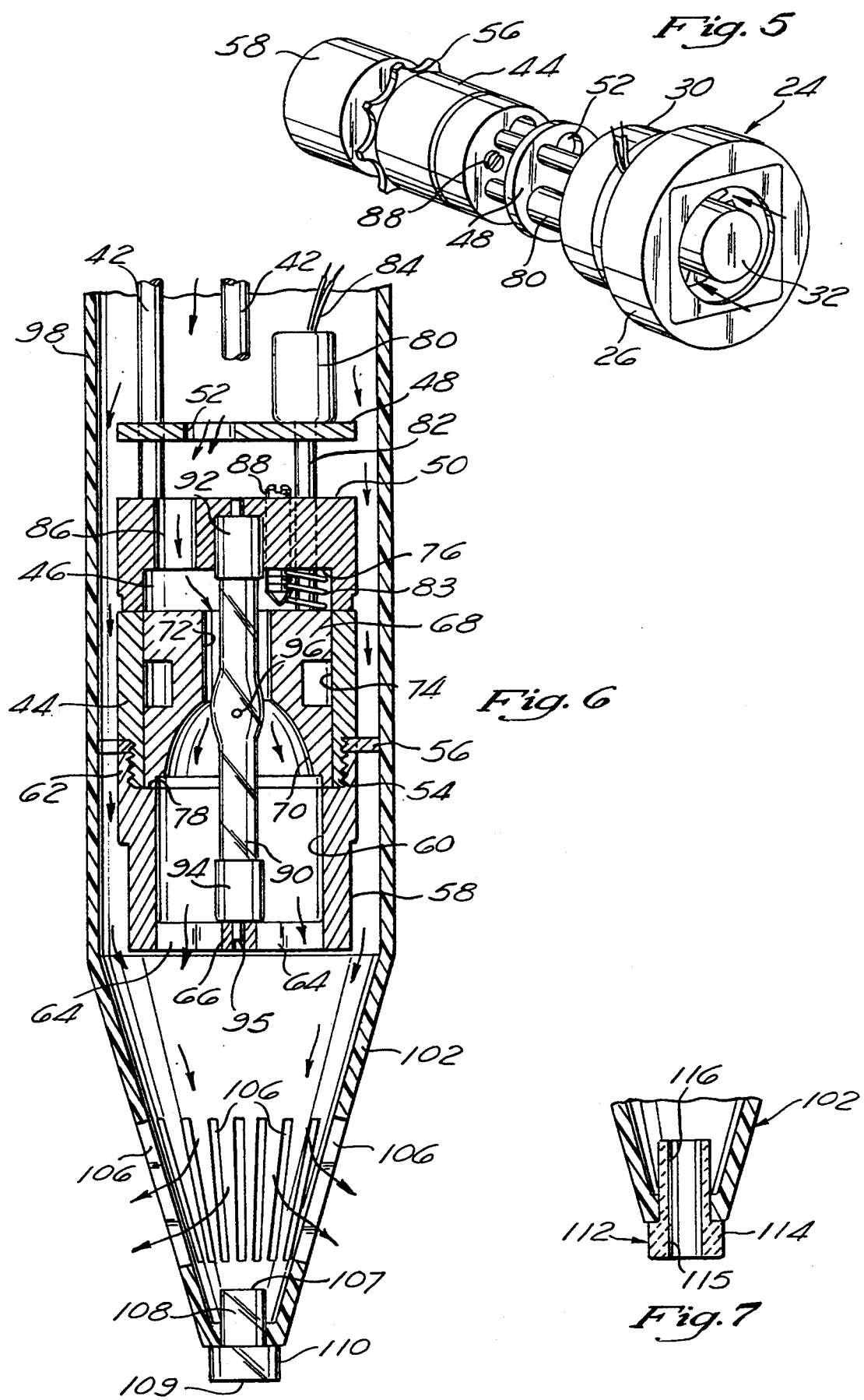

ULTRAVIOLET CURING DEVICE HAVING MOVABLE REFLECTOR

This application is a continuation, of application Ser. No. 08/070,108, filed May 28, 1993.

FIELD OF THE INVENTION

The present invention relates generally to ultraviolet curing systems and more particularly to a hand-held ultraviolet curing device which is adapted to transmit a desired frequency of ultraviolet light based upon the orientation of a reflector member relative an ultraviolet light source.

BACKGROUND OF THE INVENTION

The use of ultraviolet radiation for curing inks, coatings, adhesives and other types of compounds is well known in the prior art. Generally, the frequency of the ultraviolet radiation needed to facilitate the desired curing is dependent upon the particular chemistry of the compound being cured. In recognition of the many advantages attendant to the use of ultraviolet curing, various prior art ultraviolet curing systems have been developed for use in applications such as medical adhesive bonding, electronic assembly, conformal coating rework, wire tacking, potting and sealing, fiberoptic splicing, glass and crystal bonding, and stereo lithography.

One prior art ultraviolet curing system which is representative of many such systems currently available in the marketplace is manufactured by the Applicant and sold under the trade name "Super Spot". This particular device generally comprises a housing which is adapted to be placed upon a support surface such as a counter top and includes a mercury lamp disposed therewithin for providing a source of ultraviolet light. Also disposed within the housing is a power supply which is electrically interfaced to the mercury lamp and to a fan which is attached to the housing and adapted to circulate air therethrough to cool the lamp during its operation. Releasably attached to the housing is one end of an elongate, flexible wand which is liquid filled and adapted to transmit the ultraviolet light from the light source to an ultraviolet curable compound proximate the distal end of the wand. In the wand, liquid is used as the ultraviolet transmission medium since other transmission mediums such as optical fibers are less efficient.

Disposed between the mercury lamp and the end of the wand attached to the housing is a mechanical shutter mechanism which is selectively actuatable between open and closed positions by a solenoid which is mechanically coupled thereto and electrically interfaced to the power supply. The actuation of the shutter mechanism to the open position facilitates the transmission of ultraviolet light from the lamp into the wand, while the actuation of the shutter mechanism to the closed position blocks such transmission.

Though this system and others similar thereto are generally sufficient for exposing an ultraviolet curable compound to ultraviolet light for purposes of curing the compound, these systems possess certain deficiencies which detract from their overall utility. Once such deficiency relates to the use of the mechanical shutter mechanism to block the transmission of ultraviolet light from the light source into the wand when ultraviolet curing is not desired. In this respect, since the shutter mechanism is disposed directly in the light path, it is subjected to extreme temperature fluctuations, i.e. heating and cooling, when the system is in use. This repeated heating and cooling results in failure of the shutter mechanism thus necessitating the repair and/or replacement thereof on a frequent basis. Additionally, the liquid filled wand used with the system is expensive and may only be of limited length due to the loss of energy which occurs as the ultraviolet light travels through the wand. In this respect, since a certain ultraviolet light intensity level is typically needed to facilitate the desired curing of the compound, the length of the wand must be limited so that the losses caused by the transmission of the ultraviolet light therethrough do not result in a light intensity output which is below the level needed to achieve the desired curing. Thus, the housing of the curing system must usually be maintained in close proximity to the work piece upon which the curing operation is being conducted. The present invention overcomes these and other deficiencies associated with prior art ultraviolet curing systems.

SUMMARY OF THE INVENTION

In accordance with a first, preferred embodiment of the present invention, there is provided an ultraviolet curing device which comprises an elongate, hand-held, cylindrically configured housing having first and second opposed ends. Disposed within the housing is an ultraviolet light source which preferably comprises a mercury lamp. Additionally, disposed within the first end of the housing is a wave guide which is adapted to provide a columnar ultraviolet light output from the housing. In the preferred embodiment, the wave guide comprises a cylindrically configured quartz rod which includes an aluminum foil cladding. Alternatively, the wave guide may comprise a hollow, tubular member having a polished aluminum inner surface.

Also disposed within the housing is a reflector member which is reciprocally movable between focused and unfocused positions therewithin. When in the focused position, the reflector member reflects ultraviolet light from the light source to the wave guide and concentrates the reflected ultraviolet light on the wave guide at an angle causing total internal reflection therethrough, thus facilitating the transmission of the ultraviolet light from the wave guide at a first desired intensity level. When in the unfocused position, the reflector member disperses the ultraviolet light reflected from the light source throughout the housing interior, thus facilitating of the transmission ultraviolet light from the wave guide at a second intensity level which is substantially below the first intensity level. The reflector member preferably includes a parabolically configured reflecting surface portion to reflect the ultraviolet light from the light source, though such reflecting surface portion may alternatively be elliptically configured.

Disposed within the second end of the housing is a cooling fan which is used to force air through the housing primarily for purposes of cooling the light source. Also disposed within the housing is a solenoid which is mechanically coupled to the reflector member and is operable to selectively actuate the reflector member from the unfocused to the focused position. A power supply is also provided which is disposed external of the housing and is electrically interfaced to the light source, the fan and the solenoid. In the preferred embodiment, the power supply is adapted to simultaneously decrease the current to the light source and fan when the reflector member is actuated to the unfocused position, and simultaneously increase the current to the light source and fan when the reflector member is returned to the focused position. An adjustment member is also disposed within the housing for selectively adjusting the orientation of the reflector member relative the light source when in the focused position.

In accordance with a second embodiment of the present invention, there is provided an ultraviolet curing device which is identical to the first embodiment, but further comprises a prism member disposed within the housing intermediate the light source and the wave guide and selectively positionable therewithin. In the second embodiment, the prism member is positioned within the path of the reflected ultraviolet light and operable to separate the ultraviolet light into various frequency components and transmit a certain frequency of the ultraviolet light to the wave guide based on its particular orientation within the light path. Thus, the frequency of the ultraviolet light output from the wave guide may be selectively modified by adjusting the orientation of the prism member.

BRIEF DESCRIPTION OF THE DRAWINGS

These as well as other features of the present invention will become more apparent upon reference to the drawings wherein:

FIG. 1 is a perspective view of a prior art ultraviolet curing system;

FIG. 2 is a perspective view of the ultraviolet curing device constructed in accordance with the preferred embodiment of the present invention as grasped in the hand of a user;

FIG. 3 is a front perspective view illustrating the manner in which the internal components of the curing device are disposed within the outer cover member;

FIG. 4 is a front partial perspective view of the curing device;

FIG. 5 is a rear partial perspective view of the curing device;

FIG. 6 is a partial cross-sectional view of the curing device;

FIG. 7 is a cross-sectional view of an alternative wave guide which may be used in the curing device.

DETAILED DESCRIPTION OF THE PREFERRED EMBODIMENT

Figure 8A:
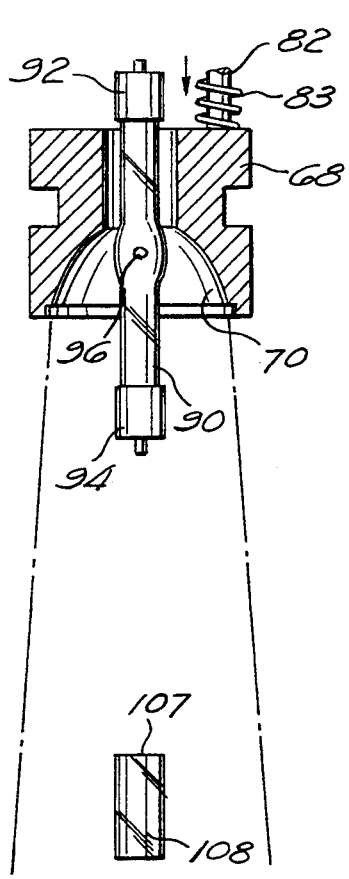
FIG. 8a is a schematic illustrating the manner in which the reflector member of the present invention disperses the ultraviolet light when in the unfocused position.

Referring now to the drawings wherein the showings are for purposes of illustrating preferred embodiments of the present invention only, and not for purposes of limiting the same, FIG. 1 perspectively illustrates an ultraviolet curing system 10 constructed in accordance with the prior art.

The prior art ultraviolet curing system 10 generally comprises a housing 12 which is adapted to be positionable upon a countertop or similar, horizontally oriented surface. Though not shown, disposed within the housing 12 is an UV light source typically comprising a mercury lamp. Also disposed within the housing and maintained in a fixed position relative the lamp is a reflector member which is adapted to reflect ultraviolet light from the lamp into an elongate, flexible wand 14 having a proximal end 16 releasably connected to the housing 12 and an opposed, distal end 18 adapted to transmit the ultraviolet light to a desired work piece to facilitate the ultraviolet curing process. In the prior art ultraviolet curing system 10, the wand 14 is liquid filled and purchased as an off-the-shelf component from the Lumatech Company in Germany. In the wand 14, liquid is used as the ultraviolet light transmission medium due to its greater transmission efficiency as compared to other transmission mediums such as optical fibers.

Also disposed within the housing 12 between the lamp and the proximal end 16 of the wand 14 is a mechanical shutter mechanism. The shutter mechanism is mechanically coupled to a solenoid which selectively actuates the shutter mechanism between open and closed positions. When in the open position, the shutter mechanism facilitates the passage of ultraviolet light from the lamp to the proximal end 16 of the wand 14. Conversely, when actuated to the closed position, the shutter mechanism blocks the passage of ultraviolet light from the lamp to the wand 14. Disposed within the side wall of the housing 12 which is oriented in opposed relation to the side wall 20 to which the wand 14 is connected, is a fan which is used to circulate air through the interior of the housing 12 for purposes of cooling the lamp. Also disposed within the housing 12 is a power supply which is electrically interfaced to the lamp, fan and shutter mechanism actuating solenoid.

In the prior art ultraviolet curing system 10, the mercury lamp serving as the ultraviolet light source must typically be energized by the power supply for a time period of approximately three minutes before the required frequency of ultraviolet radiation is transmitted therefrom. As will be recognized, cutting the power to the lamp when the transmission of ultraviolet light from the distal end 18 of the wand 14 is not desired necessitates waiting an additional time period to achieve the proper ultraviolet frequency output once the lamp is reenergized. Thus, to eliminate the need of having to cut the power to the lamp, the previously described shutter mechanism is utilized to block the transmission of ultraviolet light from the lamp to the wand 14. However, since the shutter mechanism is disposed in relative close proximity to the lamp and directly in the ultraviolet light path, it is subject to extreme temperature fluctuations, i.e. heating and cooling, during use of the system 10. These extreme temperature fluctuations give rise to repeated failure of the shutter mechanism thus necessitating frequent maintenance and repair.

In addition to the foregoing, the liquid filled wand 14, though providing certain advantages over other ultraviolet light transmitting mediums such as optical fibers, is very costly and may only be of limited length. In this respect, since a particular intensity level of ultraviolet light is generally needed to facilitate the desired curing of an ultraviolet curable compound, the length of the wand 14 must be limited since the losses which occur as a result of the transmission of ultraviolet light therethrough are directly proportional to its length, i.e. the greater the length of the wand 14, the greater the losses. As such, the maximum length at which the wand 14 may be fabricated is dependent upon the intensity level at which the ultraviolet light must be transmitted therefrom, and typically does not exceed 5 feet. Thus, in the prior art curing system 10, the housing 12 must generally be maintained in close proximity to the particular work piece exposed to the ultraviolet light which is output from the distal end 18 of the wand 14.

Referring now to FIGS. 2–6, illustrated is a ultraviolet curing device 22 constructed in accordance with a first, preferred embodiment of the present invention. In the first embodiment, the curing device 22 generally comprises a base member 24 having back 26, middle 28 and front 30 cylindrically configured portions of progressively smaller diameter, with the front portion 30 being of the smallest diameter. As seen in FIG. 5, disposed within the rear surface 34 of the back portion 26 is a cooling fan 32. In the preferred embodiment, the cooling fan 32 includes a generally square housing which is received into a complimentary recess formed in the rear surface 34. The cooling fan housing has a width, i.e. thickness, approximately equal to the width of the back portion 26 and is substantially flush with the rear surface 34 when received into the recess formed therewithin. The use of the cooling fan 32 will be discussed below.

Though not shown, the middle portion 28 of the base member 24 is preferably hollow and communicates with the recess into which the cooling fan 32 is received. As seen in FIG. 4, disposed within the peripheral side surface of the middle portion 28 is an aperture 36 which communicates with the hollow interior thereof. The front portion 30 of the base member 24 is solidly configured and includes at least one vent aperture 38 disposed within the front surface 40 thereof which also communicates with the hollow interior of the middle portion 28.

Referring now to FIGS. 4–6, attached to and extending perpendicularly relative the front surface 40 of the front portion 30 is at least one and preferably three elongate spacer rods 42. In the preferred embodiment, the spacer rods 42 extend in parallel relation, and are equidistantly spaced from each other thus generally defining a triangle. Attached to the distal ends of the spacer rods 42 is rear lamp mount 44 which has a generally cylindrical, cup-like configuration and defines a cylindrically configured interior chamber 46. Positioned on the spacer rods 42 intermediate the front portion 30 of the base member 24 and the rear lamp mount 44 is a generally circular support plate 48. The support plate 48 is rigidly secured to the spacer rods 42 and positioned in closer proximity to the back surface 50 of the rear lamp mount 44 than to the front surface 40 of the front portion 30. Disposed within the extending through the support plate 48 is at least one vent aperture 52. The support plate 48 is preferably attached to the spacer rods 42 in a manner wherein the vent aperture 52 is coaxially aligned with the vent aperture 38, and the spacer rods 42 extend perpendicularly relative the support plate 48 thus causing the same to be oriented in substantially parallel relation to the front surface 40 of the base member 24 and the back surface 50 of the rear lamp mount 44.

As best seen in FIGS. 4 and 6, the front end 54 of the rear lamp mount 44 has a recessed, externally threaded configuration. Threadably received onto the front end 54 is a spacer member 56, the use of which will be described below. Attached to the rear lamp mount 44 is a generally tubular front lamp mount 58 which defines a hollow interior 60, an internally threaded back end 62 which is threadably engaged to the front end 54 of the rear lamp mount 44, and a front end defining a plurality of spokes 64 which intersect at a central hub 66. When the front lamp mount 58 is attached to the rear lamp mount 44, the outer surfaces thereof are substantially continuous, with the spacer member 56 being compressed between the back end 62 of the front lamp mount 58 and an annular shoulder defined by the recessed, externally threaded front end 54 of the rear lamp mount 44.

Disposed within the interior chamber 46 of the rear lamp mount 44 is a reflector member 68. In the preferred embodiment, the reflector member 68 defines a parabolically configured reflecting surface portion 70 having a bore 72 disposed in the bottom thereof which extends axially through the remainder of the reflector member 68. The reflecting surface portion 70 of the reflector member 68 is preferably formed of polished aluminum which is chemically deposited thereon. Though the reflecting surface portion 70 is preferably parabolically configured, the same may alternatively be elliptically configured. The reflector member 68 itself has a generally cylindrical configuration and is sized such that the outer surface portions thereof are disposed in abutting, sliding contact with the inner surface 74 of the interior chamber 46. Additionally, as seen in FIG. 6, the depth of the interior chamber 46 exceeds the overall length of the reflector member 68 thus allowing the same to be reciprocally movable therewithin. As will be recognized, the reflector member 68 is slidably inserted into the interior chamber 46 prior to the attachment of the front lamp mount 58 to the rear lamp mount 44. Once the front lamp mount 58 is attached to the rear lamp mount 44, the forward movement of the reflector member 68 away from the bottom wall 76 of the interior chamber 46 is stopped by the abutment of the upper rim of the reflector member 68 which defines the reflecting surface portion 70 against an annular shoulder 78 defined by the back end 62 of the front lamp mount 58.

In the preferred embodiment, the reflector member 68 is reciprocally movable within the interior chamber 46 between unfocused and focused positions. In this respect, the reflector member 68 is disposed in the unfocused position when the upper rim thereof is abutted against the annular shoulder 78 as shown in FIG. 6. Conversely, the reflector member 68 is disposed in the focused position when the same is pulled rearwardly away from the annular shoulder 78 and toward the bottom wall 76 of the interior chamber 46. To facilitate the movement of the reflector member 68 between the unfocused and focused positions, attached to the support plate 48 is a solenoid 80 which is disposed between the support plate 48 and the base member 24. Extending axially from the solenoid 80 is an elongate actuation rod 82 which extends through coaxially aligned apertures disposed within the support plate 48 and rear lamp mount 44, and is rigidly attached to the reflector member 68. Disposed about the actuation rod 82 is a biasing spring 83, the opposed ends of which are abutted against the bottom wall 76 of the interior chamber 46 and the reflector member 68. The solenoid 80 is electrically powered and includes a pair of wires 84 extending therefrom. When the solenoid 80 is in the unpowered state, the actuation rod 82 thereof is normally extended outwardly due to the force exerted by the biasing spring 83 against the reflector member 68 which causes the upper rim thereof to be abutted against the annular shoulder 78, thus maintaining the reflector member 68 in the unfocused position, as shown in FIG. 6. Conversely, the application of an electrical current to the solenoid 80 via the wires 84 causes the actuation rod 82 to be drawn inwardly thus compressing the biasing spring 83 and actuating the reflector member 68 to the focused position.

In addition to the actuation rod receiving aperture, also disposed within the back surface 50 of the rear lamp mount 44 is a vent aperture 86 and an internally threaded aperture, each of which communicate with the interior chamber 46. Threadably received into the internally threaded aperture is an elongate adjustment member 88 which is used to set the focused position of the reflector member 68 by serving as a stop for the reflector member 68 during the rearward stroke thereof. In this respect, the clockwise rotation of .the adjustment member 88 will cause the pointed bottom end thereof to be extended into the interior chamber 46 and away from the bottom wall 76 thereof, thus decreasing the rearward stroke of the reflector member 68 which is abutted against the bottom end when actuated to the focused position by the activation of the solenoid 80. Conversely, rotation of the adjustment member 88 in the counter-clockwise direction causes the bottom end thereof to be drawn toward the bottom wall 76 of the interior chamber 46, thus increasing the rearward stroke of the reflector member 68 when such is actuated to the focused position. As will be recognized, the adjustment member 88 may be rotated such that the pointed bottom end thereof resides completely within the rear lamp mount 44, thus causing the rearward stroke of the reflector member 68 to be stopped by the abutment thereof directly against the bottom wall 76 of the interior chamber 46. Though not shown, the support plate 48 preferably includes an aperture therein which is coaxially aligned with the adjustment member 88 and adapted to accommodate a screwdriver or other tool which may be used to rotate the adjustment member 88. The desirability of adjusting the focused position of the reflector member 68 via the utilization of the adjustment member 88 will be discussed below.

In addition to the reflector member 68, also disposed within the interior chamber 46 is an ultraviolet light source, i.e. lamp 90, which preferably comprises a mercury lamp adapted to transmit certain, desired frequencies of ultraviolet light when energized. In the preferred embodiment, the mercury lamp 90 has an elongate, generally tubular configuration and includes a cathode adapter 92 and an anode adapter 94 attached to the opposed ends thereof. The lamp 90 further includes a bright arc 96 disposed in the center of the enlarged central section thereof which defines the point of maximum light intensity when the lamp 90 is energized. The lamp 90 is attached to the rear lamp mount 44 via the insertion of the anode adapter 92 into a corresponding recess disposed within the bottom wall 76 of the interior cavity 46. When attached to the rear lamp mount 44, the lamp 90 extends axially through the interior chamber 46. As will be recognized, during the construction of the curing device 22, the lamp 90 is attached to the rear lamp mount 44 prior to the insertion of the reflector member 68 into the interior chamber 46 and the threadable attachment of the front lamp mount 58 to the rear lamp mount 44. In this respect, after the lamp 90 has been attached to the rear lamp mount 44, the receipt of the reflector member 68 into the interior chamber 46 is facilitated by the passage of the anode adapter 94 of the lamp 90 through the bore 72 of the reflector member 68 and the recessed area defined by the reflecting surface portion 70. To accommodate the lamp 90, the bore 72 is preferably sized having an outer diameter dimension slightly exceeding the maximum outer diameter dimension of the enlarged central portion of the lamp 90, thus allowing the same to easily pass therethrough.

Subsequent to the receipt of the reflector member 68 into the interior chamber 46 in the aforementioned manner, the front lamp mount 58 is threadably engaged to the rear lamp mount 44 in a manner wherein the distal tip 95 of the anode adapter 94 is captured within an aperture extending axially through the hub 66. As seen in FIG. 6, when the cathode and anode adapters 92, 94 are attached to the rear and front lamp mounts 44, 58, the lamp 90 extends axially through the interior chamber 46, bore 72 and hollow interior 60 of the front lamp mount 58. Additionally, when the reflector member is actuated to the unfocused position, the arc 96 centered in the enlarged central portion of the lamp 90 is oriented in relative close proximity to the bottom of the reflecting surface portion 70 and bore 72. Since the lamp 90 is stationary, when the reflector member 68 is returned to the focused position by the retraction of the actuation rod 82 as is caused by the deactivation of the solenoid 80, the arc 96 will be oriented further from the bottom of the reflecting surface portion 70. The importance of the positioning of the arc 96 relative the reflecting surface portion 70 of the reflector member 68 will be discussed in greater detail below.

Referring now to FIGS. 3 and 6, the curing device 22 further comprises an elongate, tubular cover member 98 which is sized to be hand-held, and includes a back end 100 and an inwardly tapered, frusto-conical front end 102. In the preferred embodiment, the back end 100 of the cover member 98 is slidably received onto the cylindrical outer surface of the front portion 30 of the base member 24, and abutted against an annular shoulder 104 defined between the front portion 30 and middle portion 28. When attached to the base member 24 in this manner, the outer surface of the cover member is generally continuous with the cylindrical outer surface of the middle portion 28. Disposed within the tapered region of the front end 102 are a plurality of elongate slots 106 which are equidistantly spaced about the periphery thereof and define open air passages to the interior of the cover member 98. The use of the slots 106 will be described below. As seen in FIG. 6, the spacer member 56 disposed between the rear and front lamp mounts 44, 58 provides structural support to the cover member 98 when the same is attached to the base member 44.

Disposed within an opening defined by the front end 102 of the cover member 98 is a wave guide 108. In the preferred embodiment, the wave guide 108 comprises a cylindrically configured quartz rod 113 having an overall length of one-half inch to two inches, and preferably three-quarters of an inch, and a diameter of approximately ten millimeters. When inserted in the front end 102, the wave guide 108 defines an inner surface 107 and an outer surface 109. The wave guide 108 also includes an aluminum foil cladding 117 which is disposed about the quartz rod 113 but does not cover the inner and outer surfaces 107, 109. The aluminum foil cladding 117 of the wave guide 108 is not glued to the quartz rod 113, but rather is wrapped thereabout thus creating a microscopic pocket of air between the cladding 117 and the cylindrical outer surface of the quartz rod 113. Rigidly attached to and extending about the end of the wave guide 108 adjacent the outer surface 109 is a generally cylindrical locking collar 110. The insertion of the wave guide 108 into the cover member 98 is limited by the abutment of the locking collar 110 against the portion of the front end 102 defining the wave guide receiving opening therewithin. In the preferred embodiment, the wave guide 108 is maintained within the opening of the cover member 98 via the attachment of the locking collar 110 to the front end 102, and is oriented in a manner wherein the axis of the wave guide 108 extends through the focal point of the reflecting surface portion 70 and center of the spot 96. As further seen in FIG. 6, the locking collar 110 is preferably positioned about the wave guide 108 such that the outer rim 111 thereof is substantially flush with the outer surface 109.

Referring now to FIG. 7, illustrated is a wave guide 112 which may be utilized as an alternative to the wave guide 108 previously described. The wave guide 112 generally comprises a hollow, tubular member defining an enlarged head portion 114 and a bore 115 having a polished aluminum inner surface 116. Similar to the reflecting surface portion 70, the aluminum is preferably applied to the inner surface 116 of the wave guide 112 via a chemical depositing process. The wave guide 112 preferably has an overall length of approximately one and one-half inches, with the diameter of the bore 115 being approximately 8 to 15 millimeters. The wave guide 112 is attached to the cover member 98 via the insertion thereof into the opening defined by the front end 102, with such insertion being limited by the abutment of the head portion 114 against the portion of the front end 102 defining the opening therewithin. Like the locking collar 110 previously described, the head portion 114 of the wave guide 112 is preferably attached to the front end 102 of the cover member 98, thus maintaining the wave guide 112 in an orientation wherein the axis thereof extends through the focal point of the reflecting surface portion 70 and center of the spot 96. As will hereinafter be described, the wave guides 108 and 112 are adapted to facilitate the transmission of ultraviolet light from the curing device 22 in columnar fashion.

In the preferred embodiment, the cooling fan 32, solenoid 80 and lamp 90 are electrically interfaced to a power supply (not shown) which is disposed externally of the curing device 22. As previously specified, the middle portion 28 of the base member 24 defines a hollow interior. In this respect, the wires of the cooling fan 32 extend into the hollow interior of the middle portion 28, while the wires 84 of the solenoid 80 extend through an aperture disposed within the front portion 30 and into the hollow interior of the middle portion 28. Additionally, though not shown, wires extending from the anode and cathode adapters 92, 94 of the lamp 90 likewise extend through an aperture disposed within the front portion 30 of the base member 24 and into the hollow interior of the middle portion 28. As seen in FIGS. 4 and 5, from within the interior of the middle portion 28, the wires extend outwardly from the curing device 22 via the aperture 36 disposed within the middle portion 28, and are subsequently attached to the power supply.

In the preferred embodiment, the activation of the cooling fan 32 by the power supply causes air to be drawn into the cover member 98 and circulated through the curing device 22 in the direction shown by the arrows in FIGS. 3, 5 and 6. Particularly, the air is drawn by the cooling fan 32 into the front end 102 of the cover member 98 via the slots 106 disposed therewithin. The air then flows into the interior 60 of the front lamp mount 58 via the openings defined between the spokes 64 and into the passage defined between the inner surface of the cover member 98 and the outer surfaces of the front and rear lamp mounts 58, 44. The air flowing through the interior 60 of the front lamp mount 58 passes through the bore 72 of the reflector member 68 and into the interior chamber 46. The air flows out of the interior chamber 46 via the vent aperture 86 and then flows past the peripheral edge of the support plate 48 and through the vent aperture 52 disposed therein. The air exiting the vent aperture 86 and flowing about the support plate 48 and through the vent aperture 52 then mixes with the air exiting from the passage between the inner surface of the cover member 98 and the outer surfaces of the front and rear lamp mounts 58, 44. Finally, the air is drawn by the cooling fan 32 into and through the hollow interior of the middle portion 28 via the vent aperture 38 and other apertures disposed within the front portion 30. Advantageously, the flow of air into the interior 60 of the front lamp mount 58 and through the bore 72 facilitates circulation over the lamp 90 thus cooling the same. Additionally, the flow of air between the inner surface of the cover member 98 and the outer surfaces of the front and rear lamp mounts 58, 44 facilitates the cooling of the cover member 98 thus making the same more comfortable when grasped by the hand of the user. Importantly, the arcuate recesses defined by and disposed about the periphery of the spacer member 56 create passages which allow the air to be circulated between the cover member 98 and the front and rear lamp mounts 58, 44.

As previously explained, the solenoid 80 is operable to selectively actuate the reflector member 68 from the unfocused to the focused position, and only actuates the reflector member 68 to the focused position when energized. As such, the failure of the solenoid 80 will cause the reflector member 68 to remain in its normal, unfocused position due to the force exerted against the reflector member 68 by the biasing spring 83. As also previously explained, the lamp 90 is adapted to emit a desired frequency of ultraviolet radiation when energized by the power supply. As is generally the case with mercury lamps, the lamp 90 must be energized for a certain amount of time before the desired ultraviolet light intensity and frequency of ultraviolet radiation is emitted therefrom. Typically, this time period is approximately two to three minutes. Thus, when the power to the lamp 90 is cut off, the two to three minute warm-up time must be allowed to pass before attempting to use the curing device 22.

In order to avoid the warm up time delays which occur as a result of cutting the power to the lamp 90, the power supply to which the lamp 90 is electrically interfaced is adapted to decrease rather than completely shut off the current thereto when the reflector member 68 is actuated to the unfocused position. Conversely, when the reflector member 68 is in to the focused position, the power supply is adapted to increase the current to the lamp 90, thus causing the arc 96 to achieve maximum brightness and ultraviolet light output. Particularly, when the reflector member 68 is in the unfocused position, the current supplied to the lamp 90 by the power supply is reduced to approximately 60% of the power level supplied when the reflector member 68 is in the focused position and maximum ultraviolet output from the lamp 90 is desired.

As will be recognized, the heat given off by the lamp 90 is significantly increased when the current thereto is increased, and decreased when the current thereto is decreased. Since it is desirable to both cool the lamp 90 to prolong the life expectancy thereof, as well as minimize the power consumption of the curing device 10, the cooling fan 32 is adapted to run at two fixed speeds, and is run at a low speed when the reflector member 68 is in the unfocused position, and at a high speed when the reflector member 68 is in the focused position. In this respect, when the reflector member 68 is in the focused position, the power supply is adapted to increase the current flow to the cooling fan 32 simultaneously with the increase of the current flow to the lamp 90, thus causing the speed of the cooling fan 32 to increase. Advantageously, the increased speed of the cooling fan 32 provides increased air flow through the curing device 22, thus facilitating greater cooling of the lamp 90 when such is energized to its maximum brightness output. When the power to the solenoid 80 is cut off thus causing the reflector member 68 to be actuated to the unfocused position, the power supply, in addition to decreasing the current flow to the lamp 90, simultaneously decreases the current flow to the cooling fan 32, thus slowing the speed of the same. As will be recognized, when the lamp 90 is not fully energized, it does not give off as much heat as when fully energized, and may be properly cooled at a lower speed of the cooling fan 32. When the cooling fan 32 is at the high speed, the power consumption thereof is approximately one watt, and is reduced to approximately one-half of a watt to achieve the low speed when the current to the lamp 90 is reduced and the solenoid 80 is not energized by the power supply to actuate the reflector member 68 to the focused position. Thus, in the present invention, the operation of the curing device 22 is optimized in that maximum lamp output and cooling fan speed are only provided when the reflector member 68 is actuated to the focused position by the solenoid 80, with the lamp brightness output and cooling fan speed being decreased when the reflector member 68 is actuated to the unfocused position.

Having thus described the components comprising the curing device 22 constructed in accordance with the preferred embodiment of the present invention, the operation thereof will now be described. In the preferred embodiment, when the reflector member 68 is in the focused position, ultraviolet light from the arc 96 of the lamp 90 is reflected to the wave guide 108, 112 in a manner facilitating the transmission of the ultraviolet light therefrom at a first desired intensity level. When the reflector member 68 is actuated to the unfocused position, ultraviolet light from the lamp 90 is reflected by the reflecting surface portion 70 to the wave guide 108, 112 in a manner facilitating the transmission of the ultraviolet light therefrom at a second intensity level which is substantially below the first intensity level.

Figure 8B:
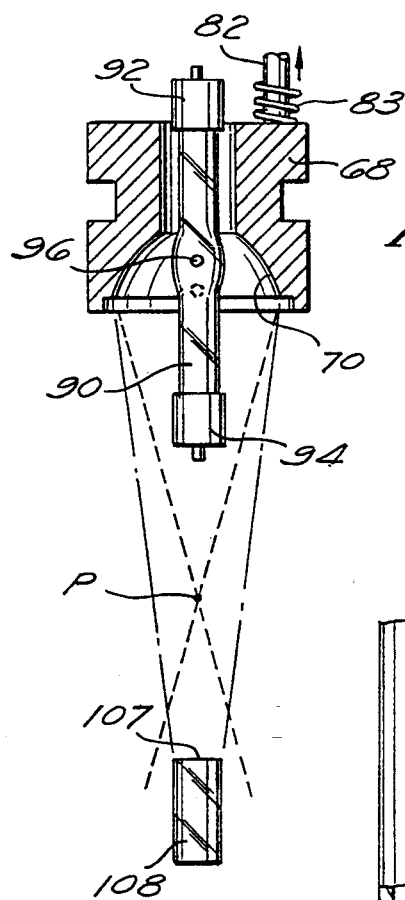
FIG. 8b is a schematic illustrating the manner in which the reflector member of the present invention concentrates the ultraviolet light onto a wave guide when in the focused position.

Referring now to FIG. 8a, when the reflector member is in the unfocused position as occurs when the solenoid 80 is not energized by the power supply, the arc 96 of the lamp 90 is oriented on the axis of, but inwardly from, the focal point of the reflecting surface portion 70, i.e. disposed closer to the apex of the parabolic reflecting surface portion 70 than the focal point. Importantly, this positioning of the lamp 90, and more particularly the arc 96, relative the reflecting surface portion 70 causes the ultraviolet light to be reflected by the reflecting surface portion 70 in the manner shown in FIG. 8a, i.e. dispersed within the interior of the front end 102 of the cover member 98. When the reflector member 68 is actuated to the focused position by the activation of the solenoid 80 as seen in FIG. 8b, the rearward movement of the reflector member 68 relative the lamp 90 causes the spot 96 to be shifted to an orientation on the axis of, but outwardly from, the focal point of the reflecting surface portion 70, i.e. disposed farther from the apex of the reflecting surface portion 70 than the focal point. Advantageously, this particular positioning of the lamp 90, and more particularly the arc 96, causes the ultraviolet light to be reflected from the reflecting surface portion 70 in a manner wherein the ultraviolet light is concentrated on the inner surface 107 of the wave guide 108.

For the desired intensity level of the ultraviolet light to be transmitted through and from the wave guide 108, the ultraviolet light must be concentrated on the inner surface 107 thereof in the manner shown in FIG. 8b. If the ultraviolet light is dispersed by the reflecting surface portion 70 in the manner shown in FIG. 8a, the desired intensity level of ultraviolet light is not transmitted through and from the wave guide 108 since there is an insufficient concentration of the ultraviolet light on the inner surface 107. As also seen in FIG. 8b, if the rearward movement of the reflector member 68 is too great, thus causing the arc 96 of the lamp 90 to assume an orientation relative the reflecting surface portion 70 which is too far outward of the focal point thereof, the ultraviolet light will be reflected by the reflecting portion 70 in a manner causing the reflected light to converge at a point P between the lamp 90 and inner surface 107 of the wave guide 108. After converging at the point P, the ultraviolet light will disperse in the manner shown, and thus not be concentrated on the inner surface 107. Once again, since the reflected light is not concentrated on the inner surface 107, such dispersion will prevent the desired intensity level of the ultraviolet light from being transmitted through and from the wave guide 108. Thus, as can be appreciated, it is necessary that the positioning of the arc 96 of the lamp 90 relative the reflecting surface portion 70 be tightly controlled when the reflector member 68 is in the focused position so as to insure that the reflected ultraviolet light is properly concentrated on the inner surface 107 of the wave guide 108.

Figure 9:
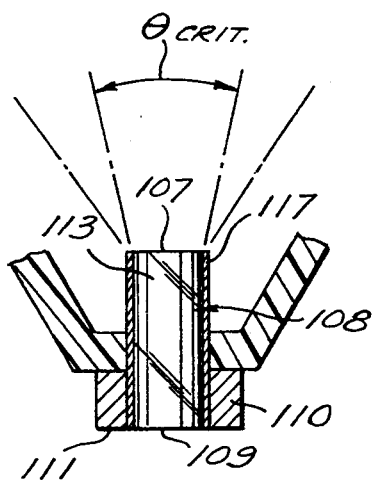
FIG. 9 is a cross-sectional view of the wave guide shown in FIG. 6, illustrating the entry of reflected ultraviolet light thereinto.

Referring now to FIG. 9, in addition to the importance of having the reflected ultraviolet light concentrated on the inner surface 107 of the wave guide 108, the angle at which the reflected ultraviolet light strikes the inner surface 107 must also be tightly controlled. As previously specified, the wave guide 108 is formed from a solid quartz rod 113 having an aluminum foil cladding 117. As also previously explained, due to the manner in which the aluminum foil cladding 117 is wrapped about the cylindrical outer surface of the quartz rod 113, a microscopic pocket of air molecules exists between the outer surface of the quartz rod 113 and the aluminum foil cladding 117. When the reflected ultraviolet light is concentrated on the inner surface 107 of the wave guide 108 within the angle defined as theta critical in FIG. 9, the light is internally reflected within the wave guide 108 and is transmitted therefrom in columnar fashion. In this respect, the columnar output of the ultraviolet light is facilitated by the total internal reflection through the wave guide 108 which occurs as a result of the application of the reflected light to the inner surface 107 at an angle not exceeding theta critical which is equal to the total internal reflection angle. To achieve proper ultraviolet transmission through the wave guide 108, the spot diameter of the light reflected onto the inner surface 107 thereof by the reflecting surface portion 70 is held within a range of five to fifteen millimeters and is preferably identical to the diameter of the quartz rod 113, i.e. ten millimeters. The losses due to internal reflection within the quartz rod 113 of the wave guide 108 are relatively insignificant.

In the event the angle of the reflected light concentrated on the inner surface 107 of the wave guide 108 exceeds the angle theta critical, the reflected light passes through the quartz rod 113 and into the microscopic air pocket between the outer surface thereof and the aluminum foil cladding 117. When this passage occurs, the light is not reflected from the aluminum foil cladding 117 back into the quartz rod 113, but rather is reflected between the outer surface of the quartz rod 113 and the aluminum foil cladding 117, thus eliminating the columnar output of ultraviolet light from the wave guide 108 as is desired. The reason the light is reflected between the outer surface of the quartz rod 113 and the aluminum foil cladding 117 disposed thereabout is due to the reflective index of the quartz being approximately 1.56 and the reflective index of the air between the quartz rod 113 and cladding 117 being approximately 1.0. As such, in the curing device 22, the orientation of the reflecting surface portion 70 relative the lamp 90 when the reflector member 68 is in the focused position is tightly controlled such that the ultraviolet light from the lamp 90 is not only concentrated on the inner surface 107 of the wave guide 108, but is also reflected thereon at an angle not exceeding theta critical, thus facilitating the columnar transmission of the desired intensity level of ultraviolet light from the wave guide 108.

Figure 10:
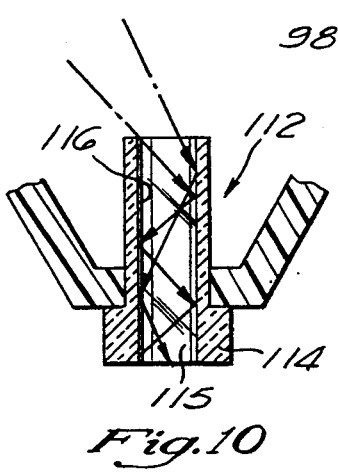
FIG. 10 is a cross-sectional view of the wave guide shown in FIG. 7, illustrating the entry of reflected ultraviolet light thereinto.

Referring now to FIG. 10, when the wave guide 112 is incorporated into the curing device 22, the reflected ultraviolet light is preferably concentrated on the inner, open end of the bore 115 in the same manner as previously described with respect to the wave guide 108. In this respect, in order for the desired intensity level of the ultraviolet light to be transmitted through and from the wave guide 112, the reflected light must be concentrated at the inner, open end of the bore 115, in that the dispersion of the reflected light in the manner shown in FIG. 8a does not facilitate the transmission of the desired intensity level through the wave guide 112. However, in utilizing the wave guide 112, the considerations regarding the angle at which the reflected light is introduced into the bore 115 are of lessened significance. Due to the formation of the wave guide 112 with the reflective inner surface 116, ultraviolet light will always be reflected therethrough irrespective of the angle at which the light is introduced into the inner, open end of the bore 115. However, as seen in FIG. 10, the more extreme the angle at which the reflected light is introduced into the open end of the bore 115, the greater the number of reflections which will occur therein prior to the transmission of light from the outer, open end in columnar fashion. Conversely, the less extreme the angle of entry, the less the number of reflections within the wave guide 112. As can be appreciated, each reflection of the light within the wave guide 112 causes some loss, thus making it advantageous to introduce the reflected light thereinto at the shallowest angle possible to cause a minimum number of internal reflections. Maximum loss within the wave guide 112 occurs when the internal reflection angles are at 90°. The aforementioned considerations are also applicable to the wave guide 108 in that light reflected to the inner surface 107 of the quartz rod 113 at an angle less than theta critical undergoes less internal reflections than light introduced into the inner surface 107 at the maximum theta critical angle. In this respect, light introduced at the maximum theta critical angle, though being totally internally reflected within the wave guide 108, undergoes a greater number of internal reflections therewithin, thus resulting in some losses.

Since the positioning of the reflecting surface portion 70 relative the arc 96 of the lamp 90 is of critical importance for the reasons previously described, the adjustment member 88 is provided for adjusting, i.e. fine-tuning, the orientation of the reflector member 68 and hence the reflecting surface portion 70 relative the lamp 90 when the reflector member 68 is in the focused position. Such adjustment typically occurs for the initial calibration of the curing device 22 and is conducted whenever the lamp 90 is replaced. When the reflector member 68 is actuated from the focused position to the unfocused position, the intensity of the reflected light concentrated on the inner surface 107 of the wave guide 108 or into the inner, open end of the wave guide 112 is approximately a hundred times less than when the reflector member 68 is in the focused position. Though the wave guide 112 presents advantages over the wave guide 108 due to the lessened significance of the introduction angle of the reflected light thereinto, the disadvantages attendant to the wave guide 112 lie in that its construction creates an open passage into the interior of the curing device 22, thus creating the hazard of foreign objects being introduced into the curing device interior.

Figure 11:
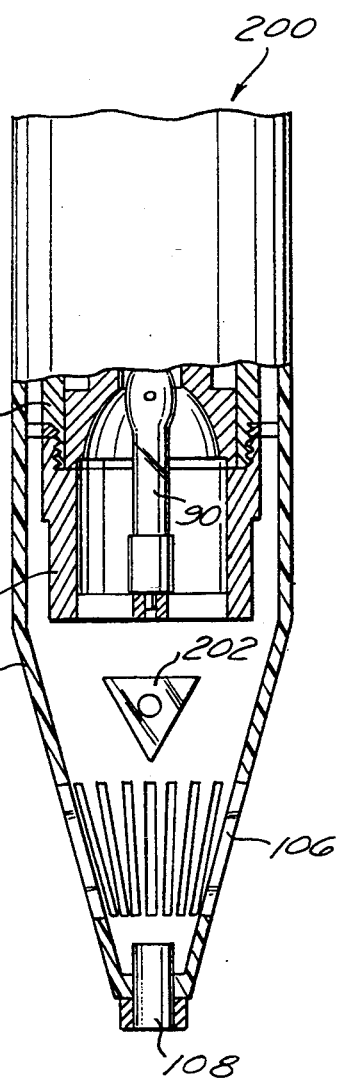
FIG. 11 is a cross-sectional view of a curing device constructed in accordance with a second embodiment of the present invention.

Referring now to FIG. 11, illustrated is a curing device 200 constructed in accordance with a second embodiment of the present invention. In the second embodiment, the curing device 200 is substantially identical to the curing device 22 previously described, but includes a prism member 202 disposed within the cover member 98 intermediate the wave guide 108 and the lamp 90. Generally, the intensity level and frequency of ultraviolet light needed to conduct an ultraviolet curing process is dependent upon the particular chemistry of the compound to be cured thereby. In this respect, different compounds typically require differing intensity levels and/or frequencies of ultraviolet light for the desired curing process to occur. In the curing device 22 previously described, the frequency of the ultraviolet light transmitted thereby is dependent upon the particular frequency output of the lamp 90. In the curing device 200 constructed in accordance with the second embodiment, the frequency of the ultraviolet light transmitted from the wave guide 108 may be altered via the selective positioning of the prism member 202 within the cover member 98. In this respect, the passage of the reflected ultraviolet light through the prism member 202 prior to being concentrated on the inner surface 107 of the wave guide 108, or inner, open end of the wave guide 112, allows selected frequencies of the reflected light to be transmitted from the curing device 200.

Figure 12:
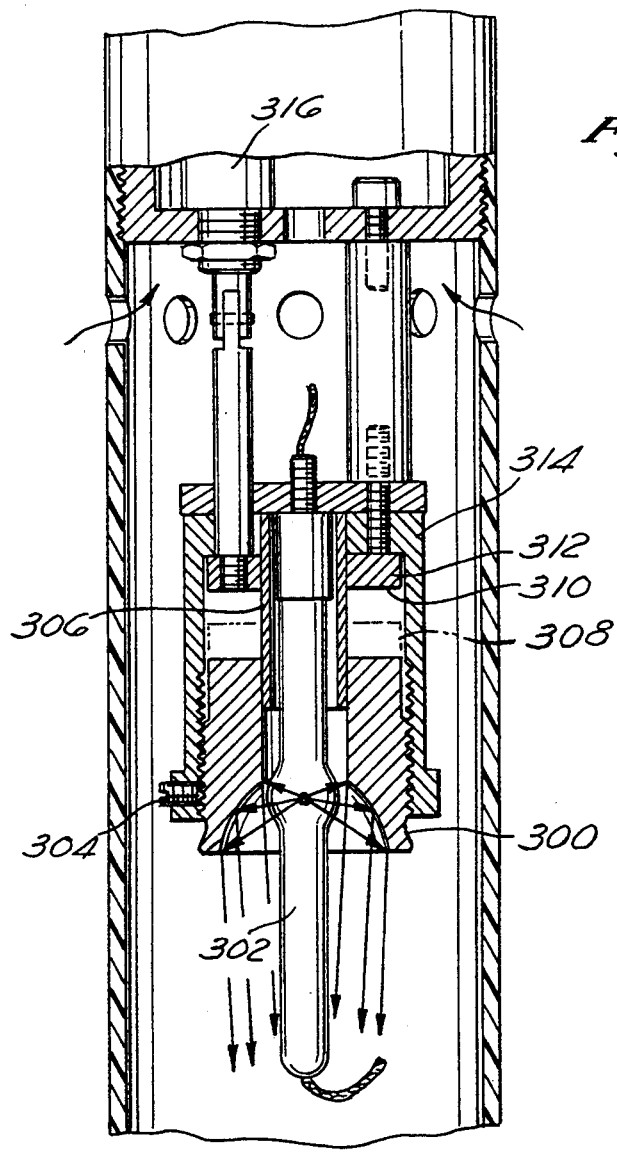
FIG. 12 is a cross-sectional view of an alternate embodiment of the invention incorporating a sleeve movable about the UV bulb.

Though the invention may be implemented in conformance with the embodiments described above, it should be understood that features and advantages of the invention may be implemented and/or enhanced by different embodiments which cannot all be described herein. For example, FIG. 12 illustrates an alternate embodiment of the invention wherein light discharged from the device is regulated not by means of moving the reflected mirror, but rather by progressively translating a shield about the UV bulb. As the shield is translated to circumscribe greater portions of the bulb, the light energy impacting the reflector is correspondingly reduced, thereby reducing the concentration of light at the output of the device. The light output may therefore be regulated without the need to move the reflector with respect to the UV bulb.

FIG. 12 illustrates an embodiment where the curing device is formed to incorporate translatable cylindrical sleeve that may be moved about the UV bulb to regulate the UV light energy output from the curing device. In the embodiment shown in FIG. 12, the reflector 300 is disposed circumferentially about UV bulb 302 in a manner generally consistent with that described above. The precise location of the reflector 300 relative to UV bulb 302 may be adjusted by means of adjusting screws 304. However, unlike the embodiments described above, the reflector 300, once set in place relative to UV bulb 302, remains in place during operation of the device. Regulation of the UV light energy output from UV bulb 302 is performed by translating a cylindrical sleeve 306 relative to the UV bulb 302. Initially, the sleeve 306 is disposed in initial position 308 wherein the lower portion of the sleeve 306 encapsulates the UV bulb 302, and the upper portion of sleeve 306, and annular washer 312, abut against the upper surface of reflector 300.

Upon activation of transducer 316, the sleeve 306 is drawn upwardly to position 310 whereupon further travel of sleeve 306 and washer 312 is opposed by housing 314, whereupon the UV bulb 312 is fully exposed within reflector 300.

As will be apparent to those skilled in the art, the translation of sleeve 306 may be regulated by transducer 316 such that the UV bulb may be partially exposed within the reflector 300 to a degree dependent upon the desired light energy to be output from the curing device. Thus, concentration of light output from the device is regulated not by varying the focus, but rather by varying the light energy that is effectively transmitted through a fixed focus system.

Figure 13:
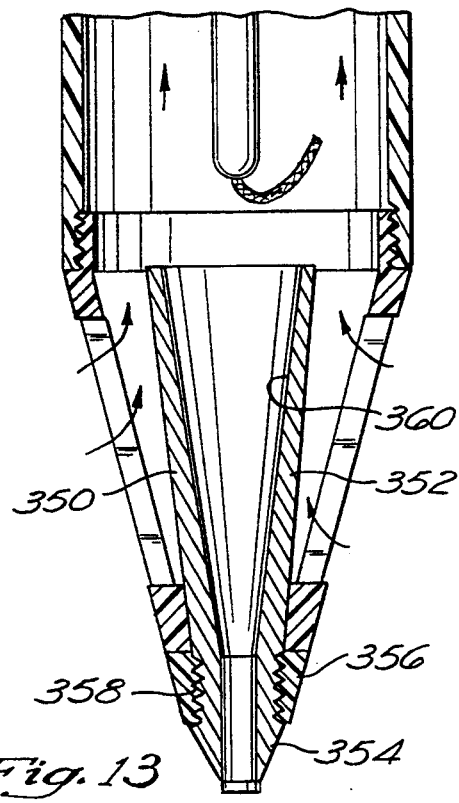
FIG. 13 is a cross-sectional view of an alternate embodiment of the invention illustrating a conical light guide.

In another embodiment illustrated at FIG. 13, the cylindrical light guide may be formed as a conical member having a highly polished inner surface. The conical shape of the light guide facilitates concentration of light output and makes the curing device more tolerant to misalignment between the UV bulb and the device output port. It is anticipated that the curing device may be formed such that the light guide is replaceable to facilitate use of either a cylindrical light guide or a conical light guide, as may be most useful for a particular application.

FIG. 13 illustrates an embodiment incorporating a conical light guide 350 having a highly polished inner surface 360. As shown therein, light guide 350 is formed to have a conical portion 352 tapering to join a cylindrical portion 354. The conical light guide is retained within the device by securing nut 356 which threadably engages light guide 350 along threads 358. Upon disengagement of nut 356, the light guide 350 may be withdrawn from the device and replaced with another light guide.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An ultraviolet curing device, comprising:
    an elongate housing having first and second opposed ends;
    and ultraviolet light source disposed within said housing;
    a wave guide disposed within the first end of said housing and adapted to transmit ultraviolet light from the housing in columnar fashion; and
    a translating, light regulating member disposed within said housing about the light source and reciprocally movable between first and second positions therewithin, said translating member being linearly displaceable relative said light source such that when in the first position ultraviolet light is communicated from the light source to the wave guide in a manner facilitating transmission of the ultraviolet light from the wave guide at a first intensity level, and when in the second position ultraviolet light is communicated from the light source to wave guide in a manner facilitating the transmission of the ultraviolet light from the wave guide at a second intensity level which is less than the first intensity level.

2. The device of claim 1 wherein said translating member comprises a parabolically configured reflecting surface portion.

3. The device of claim 1 wherein said translating member comprises an elliptically configured reflecting surface portion.

4. The device of claim 1 wherein said ultraviolet light source comprises a mercury lamp.

5. The device of claim 1 wherein said translating member is adapted to alter the amount of ultraviolet light communicated to the wave guide when moved between the first and second positions.

6. The device of claim 5 wherein said wave guide comprises a cylindrically configured quartz rod.

7. The device of claim 6 wherein said quartz rod includes an aluminum foil cladding.

8. The device of claim 5 wherein said wave guide comprises a hollow, tubular member having a polished aluminum inner surface.

9. The device of claim 1 further comprising a cooling fan disposed within the second end of the housing for circulating air through the housing and cooling the light source.

10. The device of claim 9 further comprising a solenoid disposed within said housing and mechanically coupled to said translating member, said solenoid being operable to selectively actuate the translating member from the first position to the second position.

11. The device of claim 10 further comprising a power supply electrically interfaced to said light source, said fan, and said solenoid, said power supply being adapted to increase the current to the light source and fan when the translating member is actuated to the first position, and decrease the current to the light source and fan when the translating member is actuated to the second position.

12. The device of claim 1 further comprising an adjustment member disposed within said housing for selectively adjusting the position of the translating member relative the light source.

13. The device of claim 1 wherein said housing has a generally cylindrical configuration and is sized to be hand-held.

14. The device of claim 1 wherein said wave guide comprises a conical member having a highly polished inner surface.

15. The device of claim 1 further comprising a prism member disposed within said housing intermediate said light source and said wave guide and selectively positionable therewithin, said prism member being disposed in the path of the ultraviolet light communicated from the light source to the wave guide.

16. The device of claim 15 wherein said prism member is adapted to separate the ultraviolet light passing therethrough into separate frequency components and communicate a desired frequency of the ultraviolet light to the wave guide based on the position of the prism member within the housing.

* * * * *